Figure 1:
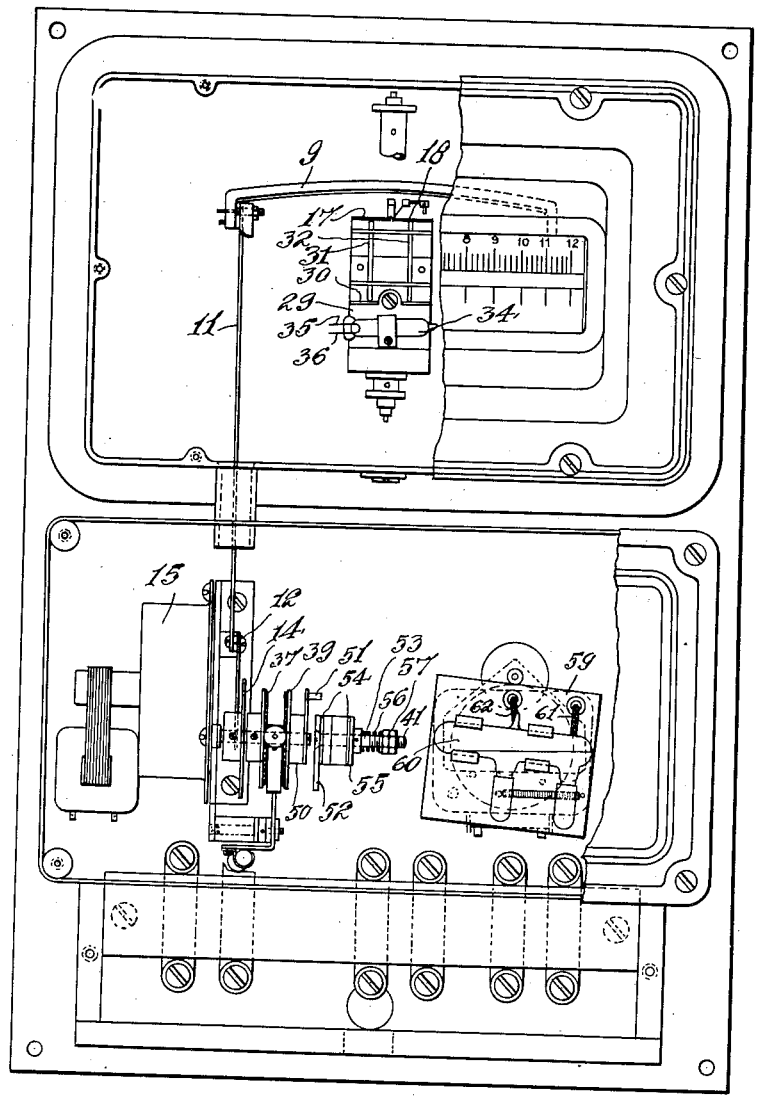

April 25, 1939.   H. LAUB ET AL   2,156,119
CONTROL DEVICE FOR HEAT GENERATING APPARATUS
Filed March 29, 1937    2 Sheets-Sheet 1

INVENTORS
Hans Laub
BY John Kramer
Frak C. Fischer
ATTORNEY.

April 25, 1939.    H. LAUB ET AL    2,156,119
CONTROL DEVICE FOR HEAT GENERATING APPARATUS
Filed March 29, 1937    2 Sheets-Sheet 2
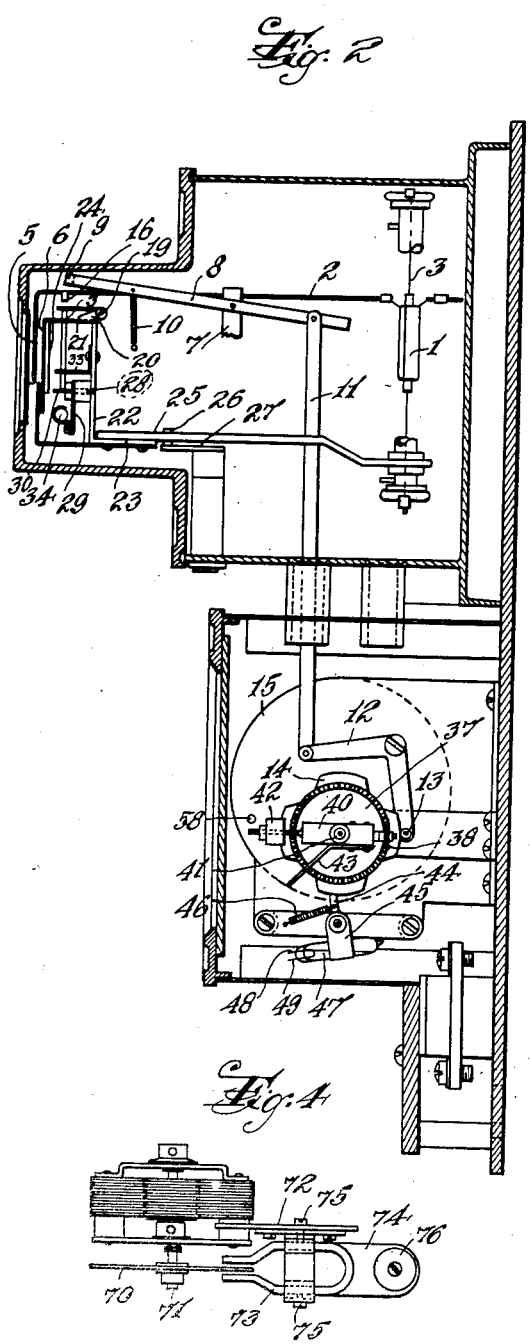
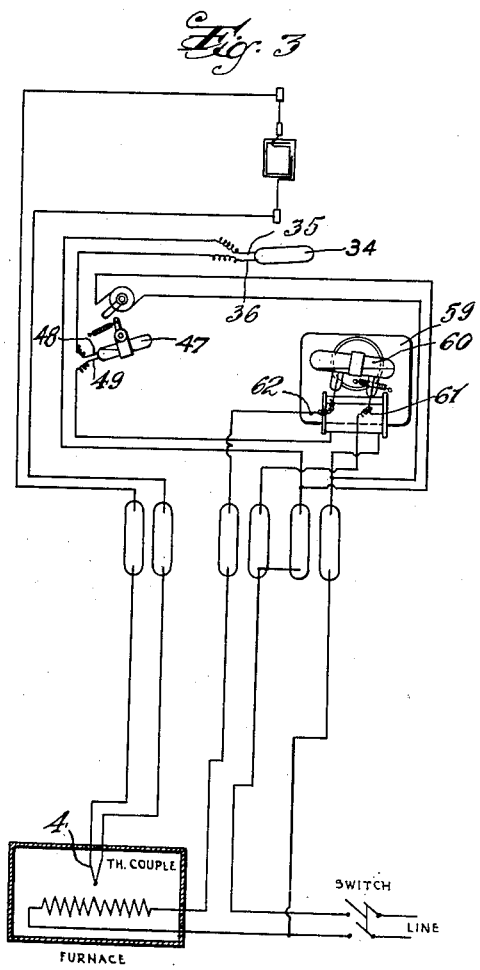
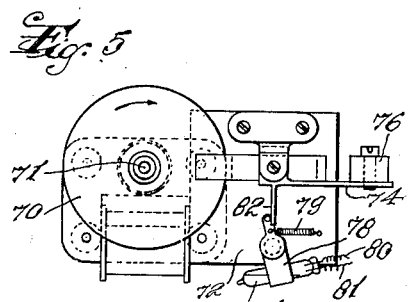

Patented Apr. 25, 1939

2,156,119

UNITED STATES PATENT OFFICE 2,156,119

CONTROL DEVICE FOR HEAT GENERATING APPARATUS

Hans Laub, Maplewood, and John Kremer, West Orange, N. J., assignors to Charles Engelhard, Inc., Newark, N. J., a corporation of New Jersey Application March 29, 1937, Serial No. 133,594

6 Claims. (Cl. 13—24)

This invention relates to electric control devices, and more particularly to improvements in automatic control devices and instruments adapted for use in connection with heat generating apparatus.

It is well known that motors used in control devices for heat generating apparatus occasionally get out of order and stop. When this happens there is a danger of the heat generating apparatus overheating, due to the failure of the control device.

It is, therefore, an object of this invention to provide in a control device for heat generating apparatus means to discontinue automatically the generation of heat should the motor or any other part of the control device cease to function properly.

It is a further object of the invention to provide an emergency control for the motor of a control device for heat generating apparatus, which emergency control is arranged to operate automatically if the motor becomes inoperative, and provides means for automatically discontinuing the generation of the heat to prevent overheating.

In accordance with the invention, a rotating part of the control device, for instance the motor spindle, is provided with means to actuate a safety switch so that when the motor stops the safety switch will be open, which action in turn disconnects the power to the heat generating apparatus controlled by the device, and also when the motor is operating properly the device closes the safety switch to connect the power to the heat generating apparatus.

These and other advantageous objects, which will later appear, are accomplished by the simple and practical construction and arrangement of parts hereinafter described and exhibited in the accompanying drawings, forming part hereof, and in which:

Fig. 1 is a front elevational view of a control instrument for heat generating apparatus with the cover removed, Fig. 2 is a side elevational view of the instrument with the cover removed, Fig. 3 is a wiring diagram of the electrical circuit associated with the instrument, Fig. 4 is a plan view of a modified form of safety device used in connection with the control instrument, and Fig. 5 is an elevational view of the device shown in Fig. 4.

Referring to Fig. 2, there is shown a control instrument for a heat generating apparatus having a movable element 1 of a galvanometer millivoltmeter, which element 1 carries a pointer 2 swinging about the suspension axis 3 of the element 1, in accordance with variations in the quantity measured by the galvanometer, which quantity in the case of a pyrometer for heat generating apparatus is generally the electromotive force of a thermocouple 4 (see Fig. 3). The pointer 2 has a downturned portion 5 which moves over a scale 6.

Pivotally connected to a part 7 of the frame of the instrument is a depressor bar 8 having an arcuate portion 9 positioned over the pointer 2 and normally urged down upon the pointer to depress the latter by a spring 10. The bar 8 is connected to a link 11 which in turn is attached to rocker 12 which has one arm thereof provided with a pin 13 engaging a cam 14 attached to the shaft of a motor 15. When the cam rotates, the depressor bar will be actuated to intermittently cause the arcuate portion 9 to be raised from contact with pointer 2 and then to be drawn downwardly by the spring 10 to depress the pointer 2.

The pointer 2 has a downwardly projecting lug 16 which when depressed is adapted to press one of the two tables 17 or 18.

The tables 17 and 18 are hingedly mounted on a pin 19 passing through ears 20 integral with the upper horizontal portion 21 of a Z-shaped bracket having a vertical portion 22 and a lower horizontal portion 23. An arcuate scale 24 is stationarily mounted adjacent the bracket and the lower horizontal portion 23 of the bracket is attached to an arm 25 connected at 26 to a crank arm 27, by means of which the tables can be adjusted relative to the scale 24 to accommodate various temperatures desired to be controlled.

Pivotally attached to the vertical portion 22 of the bracket by means of a pivot screw 28 is a plate 29 having a horizontal ledge 30 upon which rests rods 31 and 32 which are guided by small bracket 33 attached to the vertical portion 22. Mounted on the plate 29 is a mercury switch 34 having lead wires 35 and 36 through which an electrical circuit is closed by the mercury in the switch when the switch is in a horizontal position.

The safety device consists of a planetary gear system mounted on the motor spindle and a separately mounted friction device. The planetary gear system comprises three gears 37, 38 (see Figs. 1 and 2) and 39. The gear 37 is fixed to the motor spindle while the gear 39 is rotatably mounted thereon. The gear wheel 38 engages at right angles the gear wheels 37 and 39 and is loosely mounted on one end of a member 40, which is rotatably mounted on the spindle 41 of the motor. Attached to the other end of member 40 is a weight 42, and attached to the side of the member 40 is an angularly directed arm 43 which is adapted to engage the projection 44 on a bracket 45 pivotally mounted to the frame work of the instrument and move the bracket clockwise (see Fig. 2) against the action of a spring 46 to move a mercury switch 47, carried by the bracket 45, to a horizontal position, whereby an electrical circuit is broken between the electrodes 48 and 49 of the switch.

The gear wheel 39 has a hub 50 which is provided with a driving pin 51 arranged to engage an arm 52 attached to a spindle 53 of a friction device which comprises fiber washers 54, and metal washer 55. A coil spring 56 encircles the spring spindle 53 and exerts pressure against the washers to regulate the degree of friction. The force of the spring is adjusted by means of a nut 57.

In operation, when the motor 15 is not running, the member 40 will be in a vertical position whereby weight 42 is in its lowest position and the arm 43 bears against the arm 44 to move the switch 47 to an "off" position whereby the circuit is broken between leads 48 and 49. Assuming now that the instrument is connected to an electric furnace as shown in Fig. 3, when the motor 15 starts to run, the first downward movement of the depressor bar 8 will bring the arcuate portion 9 thereof in contact with both tables 17 and 18 which will tip the switch 34 to a horizontal position whereby a circuit is established between the leads 35 and 36. The depressor bar will engage both tables 17 and 18 at the initial starting of the motor because the furnace at this time is cold and the pointer will not lie above either of the tables 17 or 18.

At the same time, gear wheels 37, 38 and 39 are caused to rotate by the motor until pin 51 engages the arm 52 of the friction device, at which time gear wheel 39 stops and gear wheel 38 is caused to move around gear wheels 37 and 39 until the weighted end of the member 40 engages a stop pin 58. This movement brings the member 40 to a horizontal position and disengages the arm 43 from the arm 44 and allows the spring 46 to move the switch 47 to a tilted position to establish an electric circuit between the leads 48 and 49.

When the conductors are thus connected by the switches 34 and 47, see Fig. 3, an electrical circuit is established through relay 59 which when energized will tilt the mercury switch 60 to the "on" position, that is, established a circuit between the conductors 61 and 62, which closes the electric circuit through the furnace to cause the furnace temperature to increase.

When the furnace temperature is raised above the control temperature the E. M. F. generated by the thermocouple 4 causes the pointer 2 to be deflected from the zero position to a position above the control table 18, and on the next descent of the depressor bar 8, the table 18 will be depressed to tilt plate 29, thus tilting the mercury switch 34 and breaking the circuit between the leads 35 and 36 which deenergizes the relay 59 to cause switch 60 to move to break contact between conductors 61 and 62 to open the circuit to the furnace. After the furnace has cooled down slightly below the control temperature, the thermocouple E. M. F. will be decreased slightly and the galvanometer 2 with its lug 16 will slowly move to a position above the control table 17, and on the next descent of the depressor bar 8 control table 17 will be depressed to cause the switch 34 to be moved back to the horizontal position to reestablish the circuit between the leads 35 and 36 and to close the circuit through the relay 59 to cause switch 60 to move to make contact between conductors 61 and 62 to close the circuit to the furnace to cause the temperature in the furnace to increase.

Should the motor 15 cease to function while the power is on, the weight 42, due to gravity, will immediately drop downward away from the stop pin 58 until the auxiliary arm 43 bears against the arm 44 to tilt the switch 47 to break the circuit between the leads 48 and 49, which causes the relay 59 to be deenergized so that the switch 60 will be tilted to a position to break the circuit between the conductors 61 and 62 and thus prevent further heating of the furnace.

Referring to Figs. 4 and 5, there is shown a modified form of safety device which can be substituted for the panetary gear system and the friction device above described. In the modified form the safety device comprises a metal disc 70, preferably made of copper, which is fastened to a motor spindle 71. Attached to a base plate 72 is a magnet 73 which can be excited by a current flowing through a coil wound on it or it may be a permanent magnet without current excitation. The magnet is fastened to a bracket 74 and suspended by pivot screws 75 and counterbalanced by a weight 76. The permanent magnet is thus free to rotate about the axis of the pivot screws 75. The mercury switch 77 is mounted on a bracket 78 which is pivotally attached to a base plate 72, the bracket being commonly urged by a spring 79 to a position to establish an electrical circuit between the leads 80 and 81 of the mercury switch. The bracket is engaged by an arm 82 to tilt the switch to a position to break the circuit through the leads 80 and 81, when the magnet is in a horizontal position as shown in Fig. 5.

In operation, when the motor is running, the metal disc 70 turns in the direction indicated by the arrow in Fig. 5 and passes through the air gap of the magnet 73 thus causing electric currents to be induced in the disc. The magnetic field of these induced currents will react with the magnetic field of the magnet in such a way that the suspended magnet will move downward in the same direction as the copper disc. The arm 82 therefore moves counter-clockwise and allows the switch 78 to be moved by the spring 79 to a position to establish an electrical circuit between the leads 80 and 81. The circuit is then established through the furnace in the same manner as is described in connection with switches 34 and 47.

From the above description it will be seen that there has been provided a relatively simple and effective device for controlling the temperature of a furnace and for preventing overheating of the furnace should any part of the control device become inoperative.

While the device has been described as being applied to heat generating apparatus, it is apparent that it can be used for the control of many other types of apparatus.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:

1. In a control device for heat generating apparatus, an indicator having a pointer adapted to move over a scale to indicate the temperature of a heat generating apparatus, a depressor bar adapted to cooperate with the pointer to cause an electric circuit through the heat generating apparatus to be opened when the pointer is in a predetermined position, a motor having means to intermittently actuate said depressor bar, a planetary gear system attached to the spindle of the motor, a friction device positioned adjacent said gear system, a weighted member attached to the sun gear of the planetary gear system, a projection on one of said planetary gears adapted to engage said friction device to produce sufficient resistance to cause the weighted member to be raised when the motor is operated, a pivotally mounted mercury switch, means to normally hold said switch in the "on" position, said switch being in series with means to control the electrical circuit through the heat generating apparatus, and a projection on said switch adapted to engage the weighted member when the latter falls due to the stopping of the motor to move the mercury switch to an "off" position.

2. In a control device for heat generating apparatus, an indicator having a pointer adapted to move over a scale to indicate the temperature of a furnace, a depressor bar adapted to cooperate with the pointer to cause an electric circuit through the furnace to be opened when the pointer is in a predetermined position, a motor having means to intermittently actuate said depressor bar, a disc attached to the spindle of the motor, a pivotally mounted horse-shoe magnet between the poles of which said disc moves to induce currents in said disc to cause the magnet to be raised to a horizontal position, a weight on the magnet to cause the magnet to fall when the motor ceases to operate, a mercury switch in series with control means for the circuit through the furnace, and means associated with said magnet to move said switch to an "off" position when the motor ceases to operate and the magnet falls.

3. In a control device, an indicator having a pointer adapted to move over a scale to indicate the condition of an apparatus being controlled, a depressor bar adapted to cooperate with the pointer to cause an electrical circuit through the controlled apparatus to be opened when the pointer is in a predetermined position, a motor having means to intermittently actuate said depressor bar, a disc attached to the spindle of the motor, a magnet pivotally mounted adjacent the disc so that when the disc is moved electric current will be induced in the disc to cause the magnet to be moved to a first predetermined position, a weight on the magnet to cause the magnet to move to a second predetermined position when the motor ceases to operate, a mercury switch in series with control means for the circuit through the controlled apparatus, and means associated with said magnet to move said switch to an "off" position when the motor ceases to operate and the magnet moves to the second predetermined position.

4. In a control device for a heating generating apparatus a thermocouple responsive to the heat generated, a galvanometer responsive to the E. M. F. generated by the thermocouple, a pointer connected to the galvanometer, a depressor bar arranged to engage the pointer when the pointer is in a predetermined position, a motor, means operated by the motor for actuating the depressor bar, a first pivotally mounted mercury switch adapted when in the "on" position to close a circuit through the heat generating apparatus, an electromagnet for controlling the position of said first switch in series with the second switch and the electromagnet, a second pivotally mounted mercury switch adapted when in the "on" position to close a circuit through the electromagnet, means actuated by the depressor bar and pointer to move the second switch to an "off" position when the pointer is in a predetermined position, a third pivotally mounted mercury switch normally held in an "on" position when the motor is operating, said third switch being adapted when in the "on" position to close a circuit through the electromagnet, and means to automatically move said third mercury switch to an "off" position when the motor stops.

5. In a control device, an indicating device having a pointer adapted to move over a scale to indicate the condition of an apparatus being controlled, a depressor bar adapted to cooperate with the pointer to cause an electrical circuit through the apparatus being controlled to be opened when the pointer is in a predetermined position, a motor having means to intermittently actuate said depressor bar, a planetary gear system attached to the spindle of the motor, a friction device positioned adjacent said gear system, a weighted member attached to the sun gear of the planetary gear system, a projection on one of said planetary gears adapted to engage said friction device to produce sufficient resistance to cause the weighted member to be raised when the motor is operated, a pivotally mounted mercury switch, means to normally hold said switch in a position to close an electrical circuit through a device to control the electrical circuit through said apparatus, and a projection on said switch adapted to engage the weighted member when the latter falls due to the stopping of the motor to move said mercury switch to a position to open the electrical circuit.

6. In a control device, a galvanometer responsive to the E. M. F. generated by the apparatus being controlled, a pointer connected to the galvanometer, a depressor bar arranged to engage the pointer when the pointer is in a predetermined position, means for actuating the depressor bar, a first pivotally mounted mercury switch adapted when in the "on" position to close a circuit through the apparatus being controlled, an electromagnet for controlling the position of said first switch, a second pivotally mounted mercury switch adapted when in the "on" position to close a circuit through the electromagnet, means actuated by the depressor bar and pointer to move the second switch to an "off" position when the pointer is in a predetermined position, a third pivotally mounted mercury switch in series with the second switch and the electromagnet normally held in an "on" position when the depressor bar actuating means is operating, said third switch being adapted when in the "on" position to close a circuit through the electromagnet, and means to automatically move said third mercury switch to an "off" position when the depressor actuating means cease to operate.

HANS LAUB.
JOHN KREMER.